United States Patent
Brox et al.

(10) Patent No.: US 7,754,788 B2
(45) Date of Patent: Jul. 13, 2010

(54) LIGHT PLASTER MIXTURE IN PASTY FORM

(75) Inventors: Matthias Brox, Rotenburg a.d. Fulda (DE); Uwe Michaelis, Darmstadt (DE); Uwe Befurt, Ober-Ramstadt (DE); Holger Rettig, Lengfeld (DE)

(73) Assignee: Alsecco GmbH & Co. KG, Wildeck-Richelsdorf (DE)

( * ) Notice: Subject to any disclaimer, the term of this patent is extended or adjusted under 35 U.S.C. 154(b) by 0 days.

(21) Appl. No.: 12/063,936

(22) PCT Filed: Aug. 24, 2006

(86) PCT No.: PCT/EP2006/008322

§ 371 (c)(1),
(2), (4) Date: May 19, 2008

(87) PCT Pub. No.: WO2007/022983

PCT Pub. Date: Mar. 1, 2007

(65) Prior Publication Data

US 2008/0281028 A1   Nov. 13, 2008

(30) Foreign Application Priority Data

Aug. 24, 2005   (DE) .................. 10 2005 040 091

(51) Int. Cl.
*C08K 7/00* (2006.01)
*C04B 14/00* (2006.01)
*C09D 1/00* (2006.01)
*C09K 3/10* (2006.01)
*C08K 3/34* (2006.01)

(52) U.S. Cl. .................. 523/220; 106/400; 106/415; 106/445; 106/469; 524/8; 524/425; 524/426; 524/447; 524/449

(58) Field of Classification Search ......... 523/218–220; 106/162.51, 162.9, 164.01, 217.01, 400; 524/426, 556, 571, 8, 13, 35, 423, 425, 445, 524/447, 449

See application file for complete search history.

(56) References Cited

U.S. PATENT DOCUMENTS

| 4,391,647 A | * | 7/1983 | Deer et al. | 523/218 |
| 6,063,856 A | * | 5/2000 | Mass | 524/523 |
| 6,090,195 A | * | 7/2000 | Andersen et al. | 106/162.51 |

FOREIGN PATENT DOCUMENTS

| DE | 36 43 634 A1 | 6/1988 |
| DE | 43 37 777 A1 | 5/1995 |
| DE | 198 39 295 C2 | 3/2000 |
| DE | 101 01 433 A1 | 7/2002 |
| DE | 10 2005 011 692 A1 | 9/2005 |
| EP | 0 842 910 A2 | 5/1998 |
| EP | 1 489 056 A | 12/2004 |
| RU | 2134666 | 8/1999 |

OTHER PUBLICATIONS

Xiaodong et alli, "Polystyrene/melamine-formaldehyde hollow microsphere composite by self-assembling of latex particles at emulsion droplet interface," Polym. 46 (2005), 7598-7604.*
"Ground Calcium Carbonate" [online], http://www.exportjamaica.org/jetco/click.htm [retrieved on Jun. 22, 2009].*
Sphere Services, "Bionic Bubble(TM) W-300" in "Censospheres" [online], http://www.sphereservices.com/products.html [retrieved Jun. 22, 2009].*
English translation of International Preliminary Report on Patentability (IPRP) dated Jun. 12, 2008.

* cited by examiner

*Primary Examiner*—Vasu Jagannathan
*Assistant Examiner*—Hannah Pak
(74) *Attorney, Agent, or Firm*—Jacobson Holman PLLC

(57) ABSTRACT

The invention relates to a light plaster mixture in pasty form which has improved storage stability. This is based on a composition which contains a binder, inorganic fillers, light fillers, water and also further additives. The light plaster mixture according to the invention can be used in the form of final coats on any bases.

18 Claims, No Drawings

LIGHT PLASTER MIXTURE IN PASTY FORM

The invention relates to a light plaster mixture in pasty form which has improved storage stability. This is based on a composition which contains a binder, inorganic fillers, light fillers, water and further additives.

Plaster coatings in the form of light plasters are known from prior art in varied form. Such plaster systems can be applied directly or also in conjunction with a reinforcing layer on the most varied of bases.

A heat-insulating light plaster based on hydraulic binders and supplements made of foamed polystyrene particles which are wetted with a thin surface film made of a polymer dispersion is known from DE 101 01 433 A1. This hereby involves a dry plaster system which is mixed with water in situ, i.e. on the building site, in order to apply it directly next to the base. The additional operating step of mixing the dry system with water is associated therewith.

It was therefore the object of the present invention to provide a pasty plaster coating system which demands no additional mixing with water in situ, i.e. on the building site.

This object is achieved by the light plaster having the features of claim 1 and the use according to the invention according to claim 13. The further dependent claims reveal advantageous developments.

According to the invention, a light plaster mixture in pasty form is provided, which contains the following components (relative to 100% by mass):
a) 3.0 to 30% by mass of a binder, selected from the group comprising aqueous polymer dispersions, silicone resin, water glass and mixtures thereof,
b) 5.0 to 99% by mass of inorganic fillers with a bulk density >1 g/cm$^3$,
c) 1.0 to 30% by mass of light fillers with a bulk density <1 g/cm$^3$,
d) 0.01 to 20% by mass of additives and
e) 3.0 to 30% by mass of water.

Surprisingly, the composition of the light plaster according to the invention leads to improved storage stability. This makes it possible that the light plaster mixture can be produced already in pasty form and not as a dry system and can be delivered without additional operating steps, such as mixing with water, requiring to be implemented by the customer. The light plaster mixture is therefore present in pasty form which is suitable for direct application on any bases.

The light plaster mixture preferably contains the following components (relative to 100% by mass):
a) 4.0 to 15% by mass of the binder,
b) 30.0 to 80.0% by mass of the inorganic filler,
c) 2.0 to 10.0% by mass of the light filler and
d) 0.1 to 10.0% by mass of additives and also 6.0 to 18% by mass of water.

Materials on an inorganic basis are selected as light filler. There are included for this purpose in particular pumice, expanded perlite, blown glass, hollow glass balls and calcium silicate hydrates.

In a further variant or in addition to the light fillers on an inorganic basis, also light fillers on an organic basis can be contained. There should be mentioned amongst those in particular polystyrene.

The light filler is thereby preferably essentially spherical and has an average particle diameter in the range of 50 μm to 5 mm. The bulk density of the light fillers is thereby according to the invention <1 g/cm$^3$.

The inorganic fillers contained in the light plaster are preferably selected from the group of carbonates, silicates and oxides, these having a particle size of 2 μm to 5 mm. There should be mentioned here as particularly preferred inorganic fillers calcite, dolomite, quartz, talcum, kaolin, mica and/or chalk. The bulk density of the inorganic fillers is >1 g/cm$^3$.

The binder contained in the light plaster is selected according to the invention from the group comprising aqueous polymer dispersions, silicone resin, water glass and mixtures thereof.

In the case where an aqueous polymer dispersion is contained as binder, this contains preferably polymers which are dispersed in water, said polymer dispersion comprising the monomeric carboxylic acid vinyl esters with 3 to 20 C-atoms, vinyl pyrrolidone, ethylene-unsaturated carboxylic acids and esters thereof, amides thereof or anhydrides thereof, styrene or derivatives thereof and/or α-olefins. For particular preference, the polymers are selected from the group of polyacrylacrylates, alkylacrylate styrenes and/or butadiene/styrene copolymers.

The aqueous polymer dispersion is thereby preferably a 35 to 65% aqueous dispersion.

Preferably dispersion agents, stabilisers, defoamers, thickeners, preservatives, pigments and/or hydrophobing agents are contained as additives.

The light plaster mixture according to the invention is used in the form of final coats of any bases, in particular facades.

The subject according to the invention is intended to be described in more detail with reference to the subsequent examples without wishing to restrict the latter to the embodiments shown here.

EXAMPLE 1

A variant of the light plaster according to the invention produces a synthetic resin-bonded light plaster with the composition cited in table 1.

TABLE 1

|  | % by wt. |
|---|---|
| Water | 29.63 |
| Thickener | 0.6 |
| Additives | 2.7 |
| Titanium dioxide (d50 < 1 μm) as functional white pigment | 2.8 |
| Light filler (bulk density < 1 g/cm$^3$) | 16 |
| Filler | 33.75 |
| Copolymer dispersion based on acrylic ester/methacrylic ester 48% as binder | 11.5 |
| Preservative | 1 |
| Film-forming aid | 0.5 |
| Alkali hydroxide (% by wt. of a 20% solution) | 0.02 |
| Open-time aid | 1.5 |
|  | 100 |

EXAMPLE 2

A further variant of the plaster according to the invention relates to a silicon resin-bonded light plaster with the composition according to table 2.

TABLE 2

| | % by wt. |
|---|---|
| Water | 27.63 |
| Additives | 2.7 |
| Thickener | 0.6 |
| Titanium dioxide (d50 < 1 μm) as functional white pigment | 2.8 |
| Light filler (bulk density < 1 g/cm$^3$) | 16 |
| Filler | 33.75 |
| Copolymer dispersion based on acrylic ester/methacrylic ester 48% as binder | 9.5 |
| Silicone resin binder (60%) | 4 |
| Open-time aid | 1.5 |
| Preservative | 1 |
| Film-forming aid | 0.5 |
| Alkali hydroxide (% by wt. of a 20% solution) | 0.02 |
| | 100 |

EXAMPLE 3

A further synthetic resin-bonded light plaster according to the invention can be deduced from table 3.

TABLE 3

| | % by wt. |
|---|---|
| Water | 29.63 |
| Additives | 7.05 |
| Titanium dioxide (d50 < 1 μm) as functional white pigment | 2.8 |
| Light filler | 16 |
| Filler | 33 |
| Copolymer dispersion based on acrylic ester/methacrylic ester 48% as binder | 11.5 |
| Alkali hydroxide (% by wt. of a 20% solution) | 0.02 |
| | 100 |

EXAMPLE 4

A further light plaster system according to the invention is represented in table 4 and is likewise based on a silicone resin-bonded light plaster.

TABLE 4

| | % by wt. |
|---|---|
| Water | 27.63 |
| Additives | 7.05 |
| Titanium dioxide (d50 < 1 μm) as functional white pigment | 2.8 |
| Light filler | 16 |
| Filler | 33 |
| Copolymer dispersion based on acrylic ester/methacrylic ester 48% as binder | 9.5 |
| Silicone resin binder | 4 |
| Alkali hydroxide (% by wt. of a 20% solution) | 0.02 |
| | 100 |

TABLE 5

Silicone resin-bonded light plaster

| | % by wt. |
|---|---|
| Water | 25.38 |
| Thickener | 2.3 |
| Additives | 0.5 |
| Titanium dioxide (d50 < 1 μm) as functional white pigment | 2.8 |
| Light filler (bulk density < 1 g/cm$^3$) | 24 |
| Filler | 23 |
| Copolymer dispersion based on acrylic ester/methacrylic ester 48% as binder | 14 |
| Silicone resin binder (60%) | 4 |
| Preservative | 1 |
| Film-forming aid | 0.5 |
| Alkalihydroxide (% by wt. of a 20% solution) | 0.02 |
| Open-time aid | 2.5 |
| | 100 |

TABLE 6

Silicone resin-bonded light plaster

| | % by wt. |
|---|---|
| Water | 7.18 |
| Additives | 0.9 |
| Thickener | 0.6 |
| Titanium dioxide (d50 < 1 μm) as functional white pigment | 2.8 |
| Light filler (bulk density < 1 g/cm$^3$) | 7 |
| Filler | 62 |
| Copolymer dispersion based on acrylic ester/methacrylic ester 48% as binder | 11.5 |
| Silicone resin binder (60%) | 4 |
| Open-time aid | 2.5 |
| Preservative | 1 |
| Film-forming aid | 0.5 |
| Alkali hydroxide (% by wt. of a 20% solution) | 0.02 |
| | 100 |

TABLE 7

Silicone resin-bonded light plaster

| | % by wt. |
|---|---|
| Water | 28.38 |
| Thickener | 2.3 |
| Additives | 0.5 |
| Titanium dioxide (d50 < 1 μm) as functional white pigment | 2.8 |
| Light filler | 24 |
| Filler | 23 |
| Copolymer dispersion based on acrylic ester/methacrylic ester 48% as binder | 15 |
| Preservative | 1 |
| Film-forming aid | 0.5 |
| Alkali hydroxide (% by wt. of a 20% solution) | 0.02 |
| Open-time aid | 2.5 |
| | 100 |

TABLE 8

Silicon resin-bonded light plaster

| | % by wt. |
|---|---|
| Water | 11.18 |
| Additives | 0.9 |
| Thickener | 0.6 |
| Titanium dioxide (d50 < 1 μm) as functional white pigment | 2.8 |
| Light filler (bulk density < 1 g/cm$^3$) | 7 |
| Filler | 62 |
| Copolymer dispersion based on acrylic ester/methacrylic ester 48% as binder | 11.5 |
| Open-time aid | 2.5 |
| Preservative | 1 |
| Film-forming aid | 0.5 |
| Alkali hydroxide (% by wt. of a 20% solution) | 0.02 |
| | 100 |

The invention claimed is:

1. Light plaster mixture in pasty form containing up to 100% by mass, the light plaster mixture consisting of:
   a) 3.0 to 30% by mass of a binder, selected from the group consisting of polymers dispersed in water which are selected from polyacrylacrylates, alkylacrylate styrene and butadiene/styrene copolymers,
   b) 5.0 to 99% by mass of inorganic fillers with a bulk density >1 g/cm$^3$,
   c) 1.0 to 3.0% by mass of light fillers with a bulk density <1 g/cm$^3$,
   d) 0.01 to 20% by mass of additives selected from the group consisting of dispersion agents, stabilizers, defoamers, thickeners, preservatives, pigments and hydrophobing agents, and
   e) 3.0 to 30% by mass of water.

2. Light plaster mixture according to claim 1, consisting of
   a) 4.0 to 15% by mass of said binder,
   b) 30.0 to 80.0% by mass of said inorganic fillers,
   c) 2.0 to 10.0% by mass of said light fillers,
   d) 0.1 to 10.0% by mass of said additives,
   e) 6.0 to 18% by mass of said water.

3. Light plaster mixture according to claim 1, wherein the light filler is an inorganic light filler selected from the group consisting of pumice, expanded perlite, blown glass, hollow glass balls and calcium silicate hydrates.

4. Light plaster mixture according to claim 1, wherein the light filler is an organic light filler.

5. Light plaster mixture according to claim 1, wherein the light filler is essentially spherical and has an average particle diameter of 50 μm to 5 mm.

6. Light plaster mixture according to claim 1, wherein the inorganic fillers b) are selected from the group consisting of carbonates, silicates and oxides and have a particle size of 2 μm to 5 mm.

7. Light plaster mixture according to claim 1, wherein the inorganic fillers are calcite, dolomite, quartz, talcum, kaolin, mica, or chalk.

8. Light plaster mixture according to claim 1, wherein the aqueous polymer dispersion is a 35 to 65% aqueous dispersion.

9. A final coat comprising the light plaster mixture of claim 1.

10. Light plaster mixture according to claim 1, wherein the light filler is an inorganic light filler selected from the group consisting of pumice, expanded perlite, blown glass, hollow glass balls and calcium silicate hydrates.

11. Light plaster mixture according to claim 2, wherein the light filler is an organic light filler.

12. Light plaster mixture according to claim 2, wherein the light filler is essentially spherical and has an average particle diameter of 50 μm to 5 mm.

13. Light plaster mixture according to claim 2, wherein the inorganic fillers b) are selected from the group consisting of carbonates, silicates and oxides and have a particle size of 2 μm to 5 mm.

14. Light plaster mixture according to claim 2, wherein the inorganic fillers are calcite, dolomite, quartz, talcum, kaolin, mica, or chalk.

15. Light plaster mixture according to claim 2, wherein the aqueous polymer dispersion is a 35 to 65% aqueous dispersion.

16. Light plaster mixture according to claim 4, wherein the organic light filler comprises polystyrene.

17. Light plaster mixture according to claim 11, wherein the organic light filler comprises polystyrene.

18. Light plaster mixture according to claim 3, wherein the light filler is essentially spherical and has an average particle diameter of 50 μm to 5 mm.

* * * * *